K. GLAWATZKY.
LIFE SAVING FIRE ESCAPE.
APPLICATION FILED MAY 19, 1910.
978,447.
Patented Dec. 13, 1910.
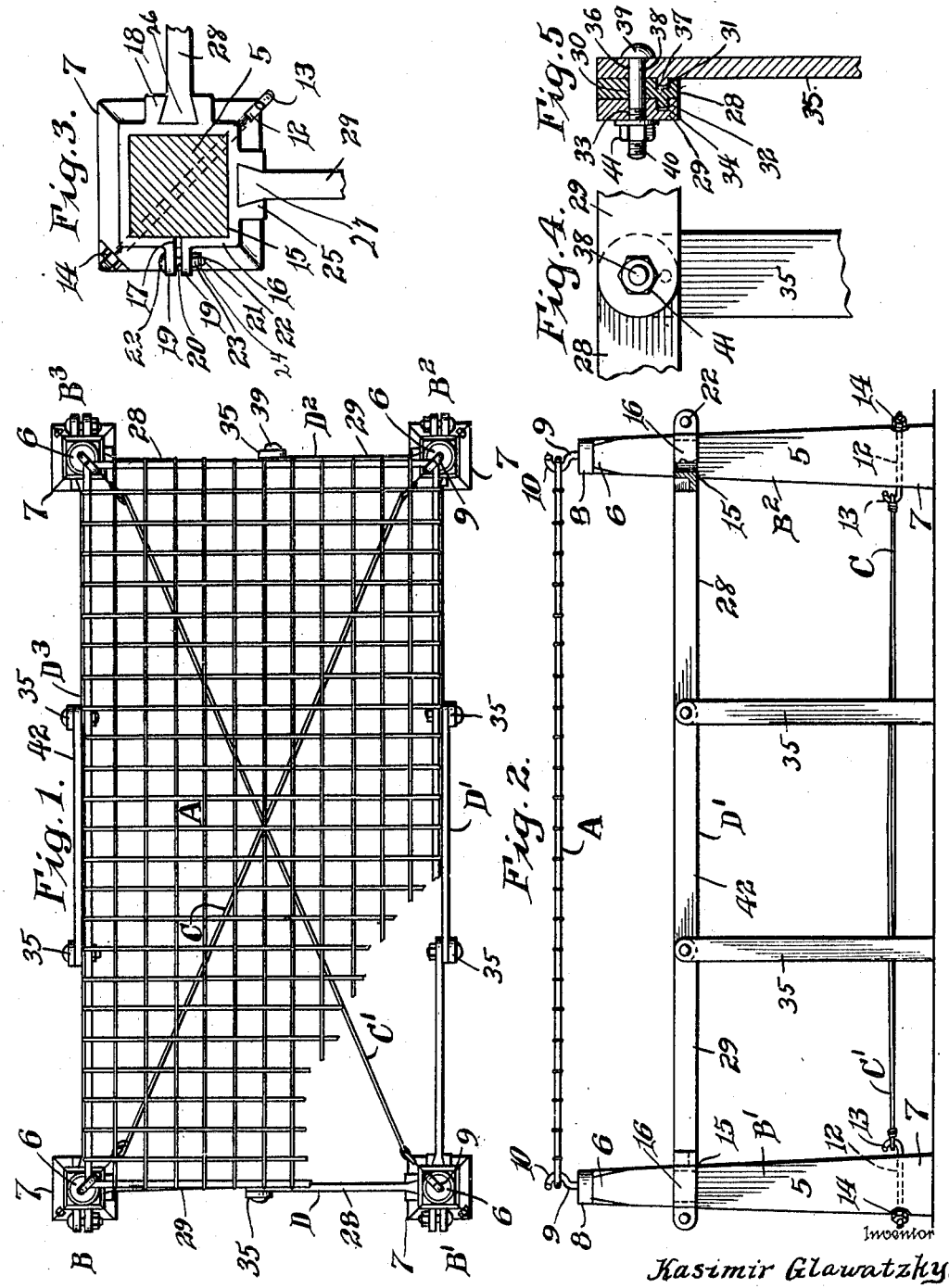
Kasimir Glawatzky.

UNITED STATES PATENT OFFICE.

KASIMIR GLAWATZKY, OF PHILADELPHIA, PENNSYLVANIA.

LIFE-SAVING FIRE-ESCAPE.

978,447.  Specification of Letters Patent.  Patented Dec. 13, 1910.

Application filed May 19, 1910. Serial No. 562,132.

*To all whom it may concern:*

Be it known that I, KASIMIR GLAWATZKY, a subject of the Empire of Russia, and a resident of Philadelphia, in the county of Philadelphia and State of Pennsylvania, have invented certain new and useful Improvements in Life-Saving Fire-Escapes, of which the following is a specification.

My invention relates to flexible fire escapes adopted to be placed in position for the purpose of receiving a person jumping or dropping from an elevation, and the object thereof is in the construction of the elements which could be quickly assembled and placed in position for supporting a spread or the like in such a manner as not to collapse and could be carried from place to place or taken apart.

With these and other objects in view, my invention consists in the construction, combination and the arrangement of parts as will be hereinafter more fully described and claimed and illustrated in the accompanying drawing, it being understood that changes in form, size, shape and other minor details may be within the scope of my claims, without departing from the spirit or sacrificing any of the advantages of this invention.

In the accompanying drawing, Figure —1, is a plan view of the device in position; Fig. —2, is an elevation thereof; Fig. —3, is a cross section of the upper left hand corner of Fig. —1; Fig. —4, is a front elevation of a joint of a foldable side, and Fig. —5, is a side elevation thereof.

Similar figures refer to similar parts throughout the several views.

The device comprises four posts B, $B^1$, $B^2$, $B^3$, joined diagonally by ropes C, $C^1$, and connected together by sides D, $D^1$, $D^2$, $D^3$. From the posts is suspended the receiver A. Each post consists of a wooden block 5, tapered to form a wide base 7, and its top rounded as at 6. The tops of the posts are reinforced by metal rings 8, and carry vertical bolts 9, having hooks 10 from which the receiver is suspended. Bolts 12, provided with hooks 13, for the ropes, are driven through the posts and are held in position by nuts 14. At some distance from their tops, the posts are recessed as at 15, for receiving the clamps 16. The clamps consist of iron bands split as at 17, and have flanges 19, provided with holes 20, for bolts 21, having heads 22, and threaded ends 23 for nuts 24. The clamps are provided with seats 18 and 25, in such a position, that when the device is assembled the seats of the clamp on one post faces the seats of the adjacent posts.

The sides consist of arms 28, provided with holes 30, and with sockets 31, below the holes, and with locking lugs 32 opposite to the sockets, and of arms 29 provided with holes 33, and with sockets 34. The sides are formed by inserting the locking lug of an arm 28 in the socket of an arm 29. A leg 35 provided with a hole 36 and with a locking lug 37 is joined to the arms by inserting its locking lug in the socket of the arm 28. A bolt 38 provided with a head 39 and with a threaded end 40 is inserted in the holes 32, 30 and 36 and a nut 41 mounted on the threaded end of the bolt is used to clamp the parts together. The arm 28 is provided with a lug 26 for a seat of a clamp of one post and the arm 29 is provided with a lug 27 for the seat of a clamp of an adjacent post. Such a side can be folded by loosening the nut sufficiently to permit of the removal of the locking lugs from their sockets. The sides D and $D^2$ are thus formed and would consist of two arms and a leg. A side as $D^1$ or $D^3$ is formed by connecting a strip as 42 between the arms and mounting a leg at each end of the connecting strip.

The device is operated as follows: Assume that it is to be used for the purpose of receiving a person who is about to jump from a window. The posts are mounted with their wide bases on the ground. The ropes are then suspended from the base hooks of each pair of posts diagonally across. The posts are then moved out until the ropes are stretched and lifted off the ground. The sides are then unfolded, the locking lugs inserted in their corresponding sockets or recesses and properly clamped. The sides are then mounted between the posts and the lugs inserted in the clamp seats. The receiver is then suspended from the top hooks. The purpose of the ropes is to prevent the posts from moving outwardly at their bases when a weight is dropped into the receiver which would tend to cause the posts to move inwardly at their tops.

Having thus described my invention what I claim as new and desire to protect by Letters Patent, is—

1. In a device of the character described the combination of a receiver for catching a falling body, posts for supporting the receiver horizontally above the ground and provided with suspending hooks, clamps mounted on the posts and provided with seats, sides consisting of legs and of arms provided with lugs for the seats of the clamps and ropes for joining the posts diagonally substantially as described and for the purposes set forth.

2. The combination of a receiver and a frame work for supporting the receiver horizontally above the ground, and consisting of tapered posts, diagonal ropes joining the posts, foldable sides between adjacent posts, clamps provided with seats mounted on the posts and lugs provided by the sides for the clamp seats substantially as described.

3. In a device of the character described, the combination of a receiver, posts provided with hooks for suspending the receiver therefrom, reinforcing means around the posts and under the hooks, recesses around the posts, clamps provided with means for clamping them in said recesses, each clamp provided with seats, foldable sides consisting of legs and of arms provided with lugs for the clamp seats and ropes for diagonally joining the posts substantially as described and for the purposes set forth.

4. In a device of the character described, a receiver, tapered posts provided with rounded tops and with wide bottoms, bolts vertically mounted in the tops and provided with hooks for suspending the receiver therefrom, reinforcing means mounted around the tops of the posts, recesses around the posts below the rounded tops, clamps for the recesses and means for clamping them on the posts, seats provided by the clamps, foldable sides consisting of legs and of arms provided with lugs for the clamp seats, bolts horizontally mounted in the posts and provided with hooks and ropes provided with means for suspending them from the hooks of diagonal posts for the purposes set forth.

In testimony whereof I have signed this specification in the presence of two subscribing witnesses.

KASIMIR GLAWATZKY.

Witnesses:
EMANUEL KLINE,
WM. PORTNER.